United States Patent
Moody et al.

(10) Patent No.: US 7,977,642 B2
(45) Date of Patent: Jul. 12, 2011

(54) IMAGING APPARATUS

(75) Inventors: Ian Moody, Chelmsford (GB); Martin Fryer, Chelmsford (GB)

(73) Assignee: E2V Technologies (UK) Limited, Chelmsford, Essex (GB)

( * ) Notice: Subject to any disclaimer, the term of this patent is extended or adjusted under 35 U.S.C. 154(b) by 0 days.

(21) Appl. No.: 12/523,459

(22) PCT Filed: Jan. 16, 2008

(86) PCT No.: PCT/GB2008/000128
§ 371 (c)(1),
(2), (4) Date: Oct. 29, 2009

(87) PCT Pub. No.: WO2008/087394
PCT Pub. Date: Jul. 24, 2008

(65) Prior Publication Data
US 2010/0084564 A1 Apr. 8, 2010

(30) Foreign Application Priority Data
Jan. 19, 2007 (GB) .................. 0701076.2

(51) Int. Cl.
*G01T 1/20* (2006.01)
(52) U.S. Cl. .................................... 250/366
(58) Field of Classification Search .......... 250/366, 250/370.01–370.15; 378/98.8
See application file for complete search history.

(56) References Cited

U.S. PATENT DOCUMENTS

| | | | | |
|---|---|---|---|---|
| 5,331,166 A * | 7/1994 | Crosetto et al. | ........... | 250/370.11 |
| 5,760,403 A * | 6/1998 | Elabd | ........... | 250/370.11 |
| 5,887,049 A * | 3/1999 | Fossum | ........... | 378/98.8 |
| 6,069,935 A | 5/2000 | Schick et al. | | |
| 6,396,046 B1 * | 5/2002 | Possin et al. | ........... | 250/208.1 |
| 7,151,287 B1 * | 12/2006 | Scheffer et al. | ........... | 257/292 |
| 7,402,809 B2 * | 7/2008 | Minagawa et al. | ........... | 250/368 |
| 2007/0176109 A1* | 8/2007 | Bell | ........... | 250/370.09 |

FOREIGN PATENT DOCUMENTS

| | | |
|---|---|---|
| EP | 1 746 442 A | 1/2007 |
| GB | 2304017 | 3/1997 |
| WO | WO 01/58148 | 8/2001 |

OTHER PUBLICATIONS

Fossum et al., "A 37/sp1 times/28mm2 600k-pixel CMOS APS dental x-ray camera-on-a-chip with self-triggered readout," Solid State Circuits Conference, Digest of Technical Papers, pp. 172-173, 1998.
International Search Report dated Aug. 16, 2008, issued in PCT/GB/2008/000128.

* cited by examiner

*Primary Examiner* — David P Porta
*Assistant Examiner* — Kiho Kim
(74) *Attorney, Agent, or Firm* — Venable LLP; Robert Kinberg; Christopher Ma (57) ABSTRACT

An imaging apparatus for x-rays includes a scintillator, overlying an array of imaging pixels on a substrate, and at least one trigger pixel array externally peripheral to the array of imaging pixels on the substrate such that the trigger pixel array is not substantially overshadowed by the scintillator from incident x-ray radiation. A layer substantially impervious to light but transparent to x-rays overlays the trigger pixel array, such that the trigger pixels are unresponsive to light but triggered by direct hits from incident x-ray photons.

22 Claims, 4 Drawing Sheets

IMAGING APPARATUS

CROSS-REFERENCE TO RELATED APPLICATIONS

This application claims priority from GB 0701076.2 filed Jan. 19, 2007 and is derived from PCT application PCT/GB2008/000128 filed Jan. 16, 2008.

FIELD OF THE INVENTION

This invention relates to an imaging apparatus and in particular to triggering an x-ray imager.

BACKGROUND OF THE INVENTION

Solid-state x-ray imagers using CCD or CMOS devices for dental and other medical applications are well known. Typically, x-ray sensors such as intra-oral dental sensors include a scintillator to convert x-ray photons from the x-ray source into light, which is then imaged by the sensor.

Usually there is no direct connection between a source of x-rays and the imaging apparatus irradiated by the x-rays passing from the x-ray source through or past an object to be imaged by which imaging may be initiated at a beginning of an x-ray exposure. Synchronization of image capture with x-ray emission may therefore be by a trigger mechanism within the sensor.

A number of methods of such triggering are well known. A first comprises continuously monitoring a dark current of some or all imaging pixels of the sensor, comparing the current with a threshold value adjusted for ambient conditions and mapped sensor imperfections such as bright pixels and triggering when the measured value exceeds the adjusted threshold. Thus GB 2304017 discloses a sensor with a comparator circuit for comparing a signal with a threshold to identify a start and finish of an exposure. A similar technique is disclosed in WO 2001/058148 in which a sensor is continuously monitored with cyclic removal of dark current effects. A problem with this approach is that the imaging pixels are not optimised for rapid triggering and are sensitive to stray light.

An alternative triggering mechanism, disclosed in U.S. Pat. No. 5,887,049, is to provide event detector cells separate from the array imaging cells, which are for example CMOS cells, and located, for example, at a periphery of the sensor array. The event detector cells are triggered by light from a scintillator, which also provides light to the imaging cells, and are therefore not optimised for rapid x-ray triggering and are sensitive to stray light. Four spaced-apart detectors are used to avoid simultaneous occlusion of all the detectors by an object being imaged.

A further triggering mechanism is disclosed in EP 06253831.9 in which optimized trigger cells are located in peripheral rows at opposed edges of an imaging array beneath a scintillator covering the imaging array and are addressed alternately.

Since the imaging array is sensitive to optical wavelengths, it is necessary to make the sensor package light-tight, but it is desirable, for comfort, and for x-ray transmission through a source-facing face of the package, to make the package as thin as possible and conveniently from a polymer material. For aesthetic reasons users use polymers coloured light blue, grey and white rather than black, which would otherwise provide the best light exclusion. It is therefore difficult to make the package completely light-tight and false triggering may occur.

In order to be compatible with x-ray exposures as short as 10 ms, a fast response time, of the order of 1 ms, is required for a trigger mechanism to sense an x-ray flux and cause the imaging device to enter an integration mode. Using CMOS detector devices there is no charge binning as with CCD devices, and so signal levels resulting from 1 ms of x-rays are relatively low. In principle it would be possible to average the voltage across each pixel but it is desirable to integrate the trigger mechanism in the sensor device and an averaging function requires too much logic to be readily integrated.

SUMMARY OF THE INVENTION

According to the invention there is provided an imaging apparatus for x-rays comprising scintillator means, overlying an array of imaging pixels on a substrate, and at least one trigger pixel externally peripheral to the array of imaging pixels on the substrate such that the trigger pixel is not substantially overshadowed by the scintillator means from incident x-ray radiation, and further comprising a layer substantially impervious to light but transparent to x-rays, such that the trigger pixel is unresponsive to light but triggered by direct hits from incident x-ray photons.

Conveniently, the imaging apparatus further comprises fibre-optic plate means underlying the scintillator means, such that the trigger pixel is not substantially overshadowed by the fibre optic plate means from incident x-ray radiation.

Conveniently, the trigger pixel has a substantially higher signal voltage per unit x-ray dose than any one of the array of imaging pixels, such that a single x-ray photon incident on the trigger pixel gives a signal substantially above a pixel read noise and such that relatively few incident x-ray photons saturate the trigger pixel, so that discrimination of a signal from noise in a 1 ms sample time is high, and the reliability of trigger is high.

Conveniently, the trigger pixel has a lower electrical capacitance than any one of the array of imaging pixels.

Advantageously, the trigger pixel is sufficiently large that charge generated by an incident x-ray photon is likely to be contained in a single pixel, rather than spread over a number of adjacent pixels.

Conveniently, the trigger pixel is approximately 20 µm square.

Conveniently, a photodiode of the trigger pixel has a substantially smaller photodiode diffusion area than a photodiode diffusion area of each of the imaging pixels. Conveniently, a photodiode of the trigger pixel will collect the charge from a near-miss photon as well as for each photon that lands inside the photodiode.

Advantageously, a read circuit for the peripheral trigger pixel is of lower complexity and higher speed than a read circuit for an imaging pixel, being just sufficient to differentiate between a small charge due to dark current and a large charge due to incidence of x-ray photons.

Conveniently, a ratio of good peripheral trigger pixels to faulty x-ray peripheral trigger pixels is sufficiently large that in a typical sample time faulty pixels permanently giving a hit or not hit state do not give a false or missed trigger.

Advantageously, the imaging apparatus further comprises threshold comparator means, for counting a number of peripheral trigger pixels having a signal above a predetermined threshold signal for comparison with a count threshold, to signal a beginning or end of an x-ray emission.

Conveniently, the array of trigger pixels can be split and each part array can be located between contact pad means located proximate an edge of the substrate Advantageously, the layer substantially impervious to light is an aluminum layer.

Conveniently, the imaging apparatus comprises a plurality of trigger pixels sufficiently spaced apart, such that in use not all of the plurality of trigger pixels may be simultaneously shadowed by one or more tooth fillings or crowns, which is or are substantially opaque to x-rays.

Conveniently, the imaging apparatus further comprises an array trigger pixel within the array of imaging pixels and covered with the scintillator means.

Conveniently, the array trigger pixel has a substantially higher signal voltage per unit x-ray dose than the imaging pixels.

Advantageously, the array trigger pixel has a lower electrical capacitance than any one of the array of imaging pixels.

Advantageously, the array trigger pixel is located in one of two rows of array trigger pixels at opposed edges of the imaging array.

Conveniently, the array trigger pixels occupy at least half a length of the opposed edges of the imaging array.

Conveniently, triggers from peripheral trigger pixels and array trigger pixels are required before integration of an image is started.

Advantageously, the imaging apparatus further comprises a trigger configuration register to specify which one or both of an array trigger pixel circuit and a peripheral trigger circuit is or are to be used to start and stop image capture respectively.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Throughout the description, identical reference numerals are used to identify like parts.

Figure 1:
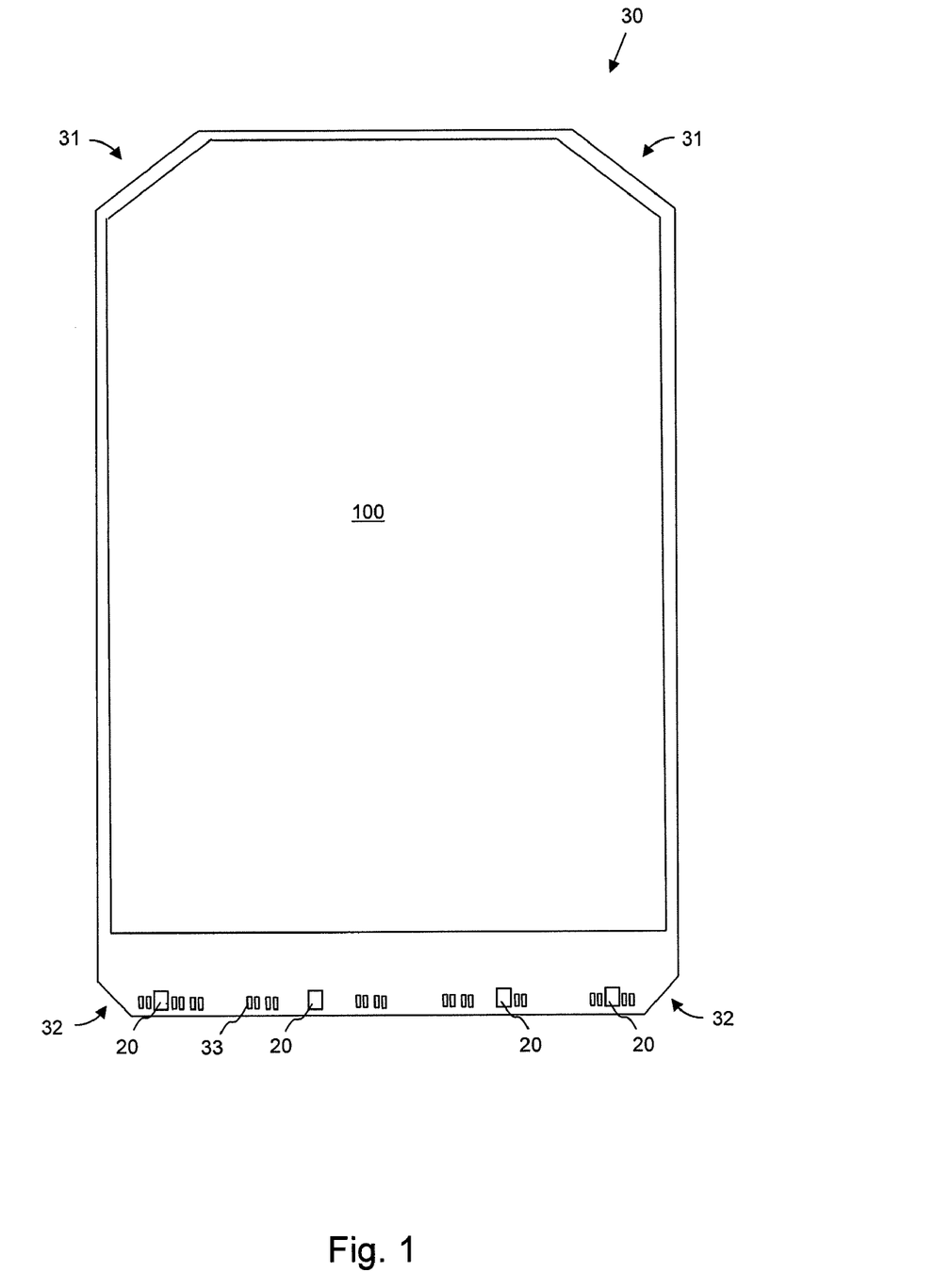
FIG. 1 is a schematic diagram of an image sensor substrate according to the invention.
Figure 4:
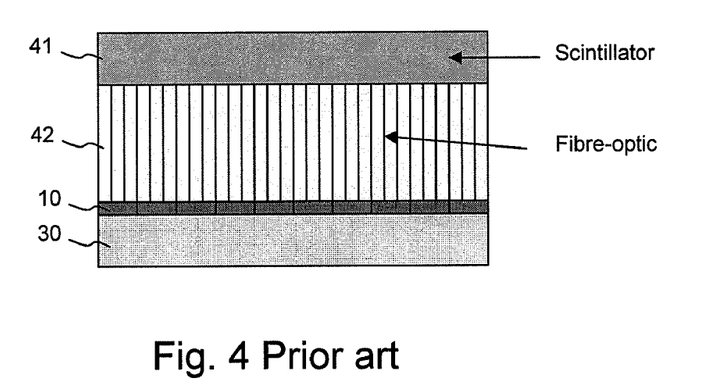
FIG. 4 is a schematic vertical cross-section diagram of a known imaging pixel suitable for use in the invention.
Figure 5:
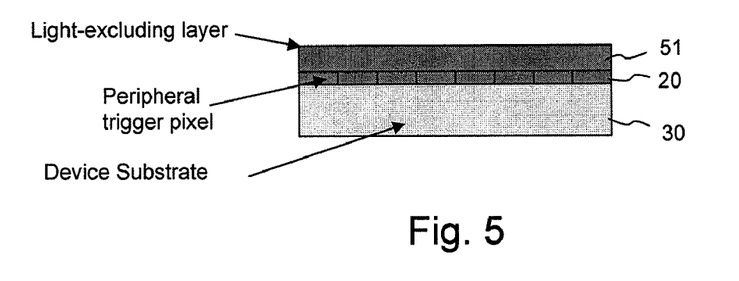
FIG. 5 is a schematic vertical cross-section diagram of a peripheral trigger pixel according to the invention.

Referring to FIGS. 1 and 4, an x-ray sensor according to the invention comprises an array 100 of imaging pixels 10, overlaid by a scintillator 41 and optionally a fibre optic plate 42, on a substrate 30 which has substantially 45 deg. chamfered corners 31 at a first end of the substrate and substantially 45 deg. chamfered corners 32, smaller than the first chamfered corners 31, at a second end to provide a more comfortable shape in a patient's mouth than a purely rectilinear shape. The second end of the substrate is provided with electrical connection pads 33. Four spaced-apart peripheral trigger pixels arrays 20 are interspersed between the connection pads 33. As best seen in FIG. 5, the peripheral trigger pixels arrays 20 are therefore not covered by the scintillator 41 but are covered instead by a layer 51 impervious to visible light but substantially transparent to x-rays, such as a thin layer of aluminum, for example approximately one micron thick. Aluminum provides a convenient light-impervious layer because aluminum layers are used in fabrication of the sensor and therefore may be laid down during fabrication. However, other metallic or non-metallic light-impervious layers which are substantially transparent to x-rays could be used instead. For example, a copper film could be used which would absorb soft x-rays but is more expensive than aluminum. In principle, even black paint could be used. The light impervious layer 51 may be a top layer metal or a lower layer or a combination of layers of metal.

It will be understood that the peripheral trigger pixels 20 need to be sufficiently distant from the scintillator 41 and, if present, the fibre optic plate 42, not to be shadowed from direct x-rays by the scintillator or fibre optic plate at intended angles of incidence of the x-rays.

This arrangement of peripheral trigger pixels 20, in which the imaging pixels 10 are overlain by a scintillator 41, and optionally a fibre optic plate 42, but the peripheral trigger pixels are not, but are protected from optical wavelengths, overcomes a conflict that x-ray direct hits are not desirable for imaging pixels but are required for x-ray trigger pixels. The peripheral trigger pixels are therefore not covered by the fibre optic plate or scintillator but instead interspersed with bond pads 33 sufficiently distant from an edge of the scintillator that they are not covered by, or shadowed by, the scintillator or fibre optic plate.

The peripheral trigger pixel is conveniently a similar size to the imaging pixels. A 20μ square is suitable for intra-oral applications. The read circuit for the peripheral trigger pixels may differ from that of the imaging pixels because it is necessary only to differentiate between a small charge due to dark current and a large charge due to incidence of x-rays.

A threshold comparator may therefore be used to determine which pixels have a large charge due to incidence of x-rays. The outputs of these may then be counted to determine the number of pixels having a large signal, and then this number can be compared to a second threshold. The second threshold comparator could for example indicate incidence of x-rays when values of 2 to 100 are exceeded.

The peripheral trigger pixel 20, which is not covered with scintillator 41, but with a coating opaque to light, has an active depth of approximately 1 um.

This will have a relatively low detective quantum efficiency (DQE) in the range of x-ray energies emitted from a dental source, e.g. between 0.2% and 2%. It is known to use deep detectors, with, for example, a 500 μm active depth, which provides a better DQE, but such detectors have high dark current at room temperature and high bias voltages, and so are not readily compatible with dental x-ray imaging.

In a trigger integration period of 1 ms, x-ray photons will only be sparsely detected. With an incident flux of say 10 x-ray photons per pixel per 1 ms, less than one pixel in about 50 will have x-ray signal: the rest will only have dark noise, but with say 2,000 off 20 μm pixels, tens of pixels will have a signal. In a photon counting mode, signal level is obtained from the number of trigger pixels showing signal, for example, 50 out of 2,000

In order to optimise responsivity of the trigger pixels, since it is not practical to provide a thick active depth for detecting energetic x-rays, it is desirable to generate a large voltage for a low charge and therefore to minimize capacitance of the device so that capacitance of the trigger pixel is substantially less than capacitance of an imaging pixel. Moreover, it is desirable to make the trigger pixel sufficiently large, say 20 µm, so that the charge generated by an incident x-ray is likely to be generated in a single pixel, rather than spread over a number of adjacent smaller pixels.

Pixels with x-ray direct hits will then have a relatively large induced signal. A 40 µm square pixel may have a full well capacity (FWC) of 1.6 Me. A lower capacitance peripheral trigger pixel, say of 20 um size, may have a full well capacity of only 50 ke–. A single x-ray photon of 32 keV energy, that lands inside this photodiode, will generate a signal of approx 8.9 ke–, i.e. 18% of FWC.

For a simple 3-transistor photodiode, the pixel area, the self-capacitance, and the charge to voltage responsivity are all linked, and with large pixels, the signal voltage generated is small. The x-ray sensitive peripheral trigger pixels will be designed to have a sufficiently small capacitance, so that a typical signal from a single x-ray direct hit can be reliably detected above a threshold. The photosite capacitance for a 50 ke– FWC peripheral trigger pixel may be 4 fF. The predicted kTC noise may be 8 e–. In this case, the trigger threshold for such a peripheral pixel can conveniently be set at 10× the noise=80 e-equivalent.

A threshold for a number of trigger pixels, which are above the trigger threshold takes into account a number of white spot defects, and cosmic ray events which might otherwise cause false triggers. That is, a two-stage cascaded threshold is provided. A trigger pixel must generate a signal above the noise floor to be counted as a trigger and a number of triggers must exceed a threshold number, say 50 in 2000 trigger pixels within a millisecond, to qualify as a trigger event. This may be compared with an expected background of say 1 trigger in 2000 trigger pixels per millisecond from cosmic rays or bright pixels.

Triggering then requires reading out the array of trigger pixels every 1 ms and detecting an increase of more than say 5 pixels which are above the first threshold.

Additional similar trigger pixels, but not covered by a light impervious layer, may be included in the imaging array beneath the scintillator for detecting x-ray stimulated light from the scintillator. This advantageously provides two trigger technologies for a same sensor device—a scintillator-linked detector and a direct x-ray based photon peripheral detector.

Figure 2:
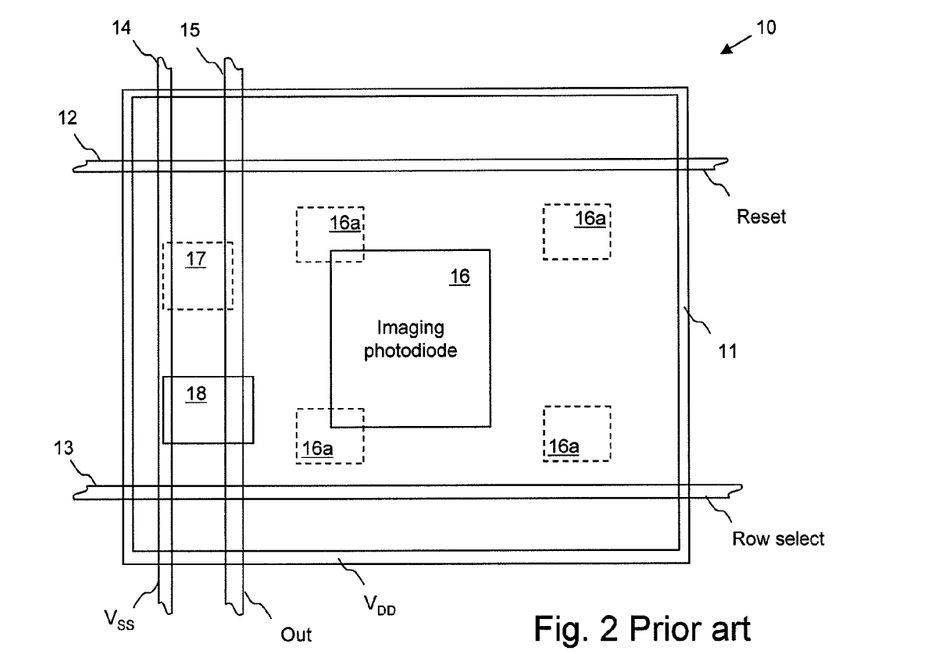
FIG. 2 is a schematic diagram of a known imaging pixel.

Referring to FIG. 2, a known image capture pixel 10 of an x-ray sensor is surrounded by a power feed 11 of multiple metal layers at a voltage VDD. As illustrated, the pixel is traversed horizontally proximate an upper edge of the pixel by a reset connector line 12 and proximate a lower edge by a row select connector line 13. The pixel is traversed vertically proximate a left hand edge, as viewed in FIG. 1, by a $V_{SS}$ connector line 14 and a output connector line 15. An imaging photodiode is located substantially centrally of the pixel. Alternatively, an array of four smaller photodiodes 16a may be provided as indicated by broken lines.

Figure 3:
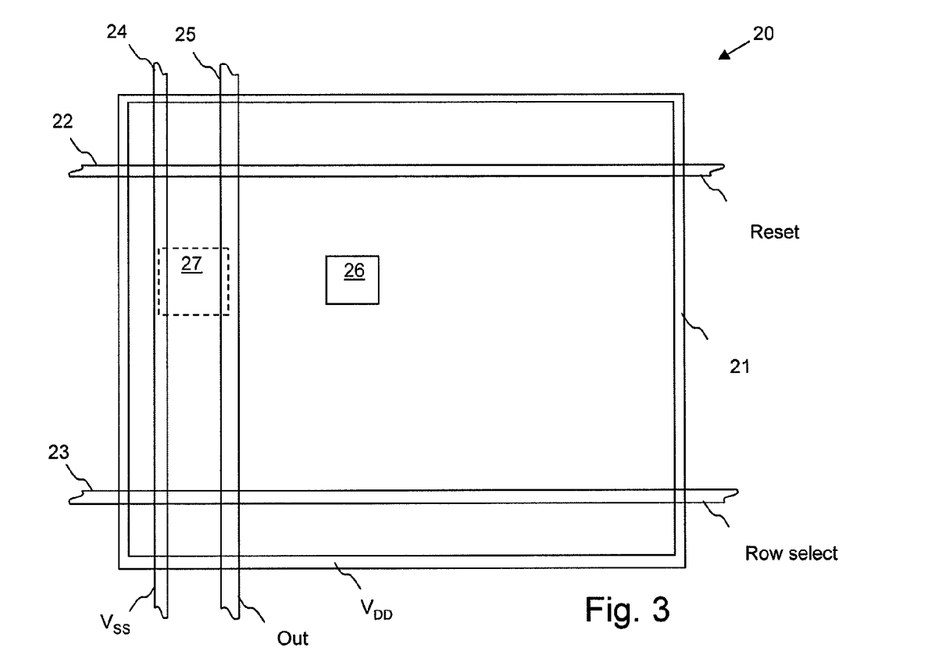
FIG. 3 is a schematic diagram of a trigger pixel suitable for use in the invention.

Referring to FIG. 3, an array trigger pixel, substantially a same size as a imaging pixel of FIG. 1, is also surrounded by a metal power feed 21 at a voltage $V_{DD}$. The pixel is traversed horizontally proximate an upper edge of the pixel by a reset connector line 22 and proximate a lower edge by a row select connector line 23. The pixel is traversed vertically proximate a left hand edge, as viewed in FIG. 2, by a $V_{SS}$ connector line 24 and a output connector line 25. A triggering photodiode 26, substantially smaller than the imaging photodiode 16 of the imaging pixel, is located substantially centrally of the triggering pixel. Read and reset transistors 27 are located beneath the $V_{SS}$ connector line 24 and an output connector line 25. The array trigger pixel is conveniently more sensitive than an array imaging pixel and conveniently has a lower capacitance.

A metallic filling of an adult tooth could obscure a single sufficiently small trigger area. Two trigger areas in strip form, at least half the width of the array, at the top of the array, and at the bottom of the array, are normally sufficient to ensure that not all trigger pixels are obscured by such fillings. There is therefore a requirement to provide a substantial area of trigger pixels, for example 20 mm wide and 40µ high.

A typical x-ray source for dental x-rays has a maximum x-ray energy of 60 keV and a typical x-ray energy of 32 keV. The lowest x-ray energy emitted is 10 keV, because x-rays of lower energy than 10 keV are absorbed by an aluminum window on the source. Provided all charge is collected in one pixel, a single photon at this worst case energy results in a signal of 2,777 e– in silicon, i.e. usually well above a noise floor of an imaging device. The peripheral trigger circuit needs to respond in 1 ms to 2 ms to be compatible with x-ray exposures as short as 10 ms Thus, in one embodiment there are two rows of special array trigger pixels (with reduced full diode charge of say around 100 ke compared to image pixels at say 600 ke–), covered with scintillator, one at each of upper and lower edges of the main array, in addition to the peripheral trigger pixels. These are driven through a sequence of reset, integration for a preset time, read out, quantization by an ADC, comparison with a threshold, counting of significantly irradiated pixels and comparing the count with a trigger event threshold (in the region of 5 to 10% of a row to allow for shadowing by fillings). If the number of significantly irradiated pixels is above the trigger event threshold, the main array is taken out of reset and allowed to integrate an image, otherwise the sequence is repeated. Given that the main imaging array will saturate at an x-ray duration of say 200 ms, the array trigger pixel will have a maximum signal of only 3% of saturation after a 1 ms integration time, and usually much less, due to attenuation by cheek, gum and bone. The array trigger integration time may need to be longer than 1 ms before trigger can be reliably detected above noise.

Thus trigger pixels may be located within the imaging array as well as externally peripheral to the imaging array. The peripheral trigger pixels are sensitive only to x-rays, i.e. the trigger pixels are of silicon only, with no scintillator, covered with aluminum, since these will reject package light leakage.

Trigger pixels used within the imaging array are conveniently a same size as the imaging pixels so that the trigger pixel may be aligned with the imaging pixels and the connector lines.

In summary, essentially, the peripheral trigger pixel should be designed to collect the maximum amount of, and minimize the spreading (between adjacent pixels) of, charge generated from x-ray interaction events, some of which will be deep in the silicon. The peripheral trigger pixel will conveniently be exclusive of mechanisms to guard, dump or recombine deeply generated charge resulting from x-rays. The peripheral trigger pixel will conveniently be more sensitive than an array imaging pixel and conveniently have a lower capacitance. Pixel arrays of this nature, with typical active depths in the region of 1µ, when illuminated with x-rays, will have relatively few pixels with signal, and these will be relatively bright.

Conveniently, the array trigger pixel will be designed to collect charge from both direct x-ray events and from the scintillator light emission. The array trigger pixel will conveniently be exclusive of mechanisms to guard, dump or recombine deeply generated charge resulting from x-rays. The array trigger pixel will conveniently be more sensitive than an array imaging pixel and conveniently have a lower capacitance.

Conveniently, the image pixel will be designed for higher MTF than either the peripheral trigger or array trigger pixel, when imaging light in the wavelength range of typical scintillators. The image pixel might include mechanisms to guard, dump or recombine deeply generated charge resulting from x-rays.

Figure 6:
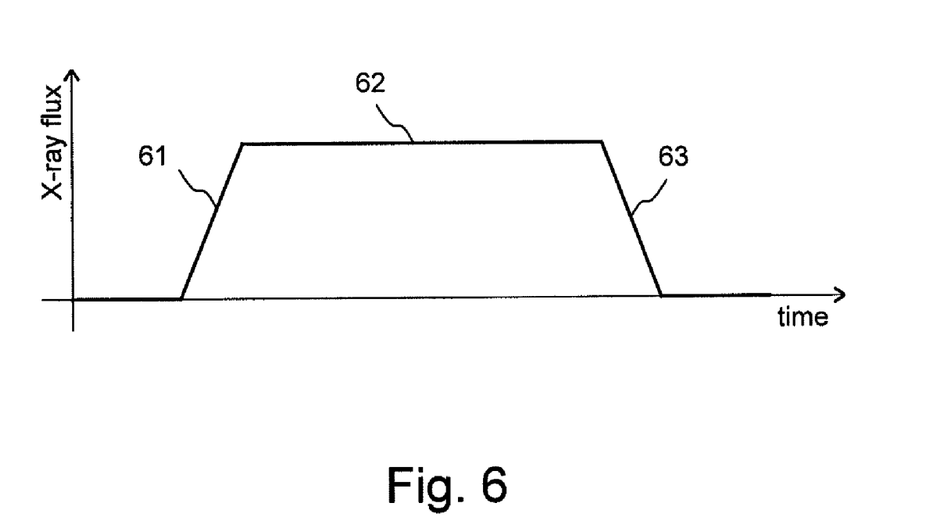
FIG. 6 is a graphical representation of an x-ray emission from a DC powered x-ray source suitable for use with the invention.
Figure 7:
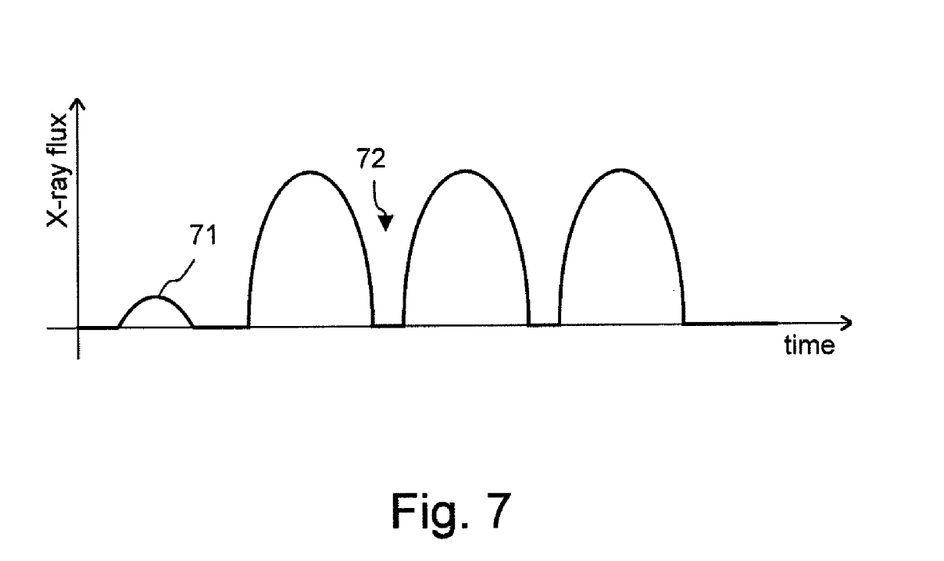
FIG. 7 is a graphical representation of an x-ray emission from an AC powered x-ray source suitable for use with the invention.

The trigger system described is suitable for both DC powered and AC powered x-ray sources. As shown in FIG. 6, DC powered x-ray generators often have a smooth ramp up 61, a flat main pulse 62 and a smooth ramp down 63. However, for an AC powered x-ray generator the start of emission can be non-monotonic as shown in FIG. 7, giving a weak pulse 71 before a start of the main exposure which may be a modulated pulse with short gaps 72 between pulses. Using an AC generator can also confuse an end of x-ray detection by having significant amplitude variation during the burst, but any trailing weak pulse after the real end can be ignored. The system will detect the end of the burst of x-rays within around one millisecond, again in the presence of arbitrarily placed metal dental fillings and faulty bright and faulty dark pixels.

To allow a typical short dose of 10 ms to be captured with little image loss a target of one millisecond is provided to detect a start of an x-ray emission. The same target is set for detection of an end of the x-ray emission partly to start image download as soon as possible and so avoid adding more dark current noise than necessary, but also to allow the exposure time to be measured. However, increasing the one millisecond target to approximately ten milliseconds is unlikely to be problematic if the increased response time makes detection more reliable. With a low flux and long exposure there is more scope to allow a longer trigger delay. An alternative mode of operation for the use of very low flux x-rays is to put the imaging array into integration mode during each search for a trigger and then keep the image if trigger is found or reset the array if there is no trigger.

A signal "trigger" is used herein to refer to detection of a start of an x-ray dose and a signal "untrigger" to indicate detection of an end of the dose.

When an AC powered x-ray generator is used the short periods 72 of no flux or of greatly reduced flux during the main pulse can give premature untrigger. However, to overcome this a delay can be programmed into an Untrigger Delay Time register to delay the effect of untrigger until the x-ray dose is definitely complete.

As indicated above, two on-chip trigger circuits may be provided. The first trigger circuit is the peripheral trigger using a dedicated array of small pixels which are shielded by metal and hence are sensitive only to x-rays. A second trigger circuit comprises an array trigger using two rows of modified pixels in the main pixel array (trigger rows), which are sensitive to light photons from the scintillator. The imager may use a trigger configuration register to determine which one, or both, trigger circuits to use to start and stop image capture. In one embodiment, the main control logic drives and senses the 'trigger row' trigger, whereas the peripheral trigger is more self-contained with its own control logic.

Whichever trigger circuit is used for each image the time from trigger to untrigger is measured by counting clock pulses. The same duration can then be used to capture a dark frame after the image has been downloaded, to give an optimum accuracy for cancellation.

While the main array is integrating, the trigger rows continue their cycle of reset, integration, read out, quantization, threshold detection, counting of significantly irradiated pixels and the counts compared with the untrigger event threshold. If the number falls below the untrigger event threshold the main image array download is initiated.

A timer set by Image Maximum Integration Time registers sets a time at which image download is started even if an untrigger has not occurred, of if the Untrigger Delay Time is still being counted.

If a fixed integration time is needed an Array Untrigger Event Threshold can be programmed to zero to prevent an untrigger from occurring and so to integrate for exactly a time set by Image Maximum Integration Time registers.

An alternative trigger plan is an option for use with very low flux x-rays. This will set a longer integration time (10 or 20 ms for example) for the trigger circuits (array and peripheral) to improve the signal to noise ratio, possibly to a time as long as the duration of the x-ray pulse. This mode changes the reset timing of the main array so the main array can be reset only at each decision point of the trigger system and the array will attempt to integrate an image while the trigger circuits integrate an x-ray detect. A trigger decision of no x-rays will give a reset to the main array synchronous with the regular trigger reset, but a trigger decision of x-rays detected will block the reset to the main array and allow image integration to continue. This image integration will continue until the trigger system detects an untrigger after one or more trigger cycles. Once an untrigger is detected or the Image Maximum Integration Time is reached as a time-out the image download process will start.

By using a combination of programmable pixel voltage threshold and a count of pixels with significant exposure the effect of a few faulty pixels (bright or dark) is removed by the count threshold. The effect of changes in the general level of dark current are removed by setting the pixel voltage threshold at a level corresponding to an exposure well above the largest expected dark current for the programmed integration time, but below the level expected for mid-exposure image pixels. The trigger pixels are at least six times more sensitive than imaging pixels, so even although they are integrating for a shorter time (1 ms in 10 to 250 ms) the fact that the circuit only needs to detect a number of well-exposed pixels gives a good margin above dark signal. If it is not possible to select a suitable threshold it is also not possible to get good image quality, even with dark frame cancellation. Finally, a complete row of pixels may be used so that at least some of them will be clear of shadows from fillings—this also means that the count threshold must be set to a small fraction of the number of pixels in a row. The several thresholds are all programmable over a control bus. Characterization and trials may be performed to find optimum settings for the most reliable trigger and untrigger detection.

A control loop using this imaging device, the interface module and a PC can be arranged to track changes in operating conditions and automatically adjust the trigger settings.

Operation of the peripheral trigger is quite similar to operation of the array trigger described above, but the peripheral trigger structure is optimised for x-ray trigger detection. The peripheral trigger uses the whole of a dedicated array of pixels instead of just two trigger rows, this peripheral trigger array being split into three or four physically spaced arrays to avoid shadows of fillings, with the control signals wired to give the effect of a single larger array. There is no scintillator over the peripheral trigger pixels, but there is metal over the peripheral trigger pixels to avoid any stray light giving a trigger The pixel capacitance is made very small to give the maximum voltage output for each direct x-ray photon and the read operation is simplified. For example, with a charge capacity of around 50 ke the charge from a single x-ray photon (~10 ke) gives up to 20% of full discharge, depending on how many pixels share the x-ray photon (likely to be 1, 2 or 4, depending on where in the pixel matrix the x-ray photon is detected). The read simplification removes the ADC by using a reduced precision and limited range DAC to put a fixed comparison voltage (set over the control bus) onto the column comparators such that one or more x-ray photons hitting a pixel will give a distinct output, while dark current will not reach that level in any good pixel.

The whole array is read and all hits counted and then compared with a number, the Periphery Trigger Event Threshold. It is expected that a typical x-ray flux will give around 50 hit pixels in a one millisecond integration time with an array of 2000 pixels. This count of ~50 is large enough to allow a few faulty pixels to be permanently giving a hit or not hit state without giving false or missed trigger. As in the array trigger circuit a low count resets the trigger array and starts a new integration cycle and a high count gives a trigger output to begin the capture of an image.

While the main array is integrating, the peripheral trigger continues its cycle of reset, integration, read out with threshold detection, counting of hits and the counts compared with the Periphery Untrigger Event Threshold. If the number falls below this untrigger event threshold the main image array download is initiated.

As in the array trigger there is a time-out set by an Image Maximum Integration Time register and this can also be used to set a fixed integration time by loading all zeros into a Periphery Untrigger Event Threshold register.

A low flux alternative trigger, as described in the array trigger discussion above, can also be used with the peripheral trigger, depending on which trigger block is selected by a Trigger Configuration Register.

As with the array trigger, a control loop using this imaging device, an interface module and a PC can be arranged to track changes in operating conditions and automatically adjust the Periphery Trigger Event Threshold and Periphery Untrigger Event Threshold settings.

A Trigger Control Register determines which of the two trigger circuits, or a combination of both, are used to detect on or off triggering events.

Trigger cells below a scintillator, such as the array trigger pixels mentioned above, are sensitive to visible light, and are susceptible to light leakage through packaging of the sensor, for instance from an inspection spotlight, causing false triggering of the sensor which is armed before being placed in a mouth of a patient. Although black carbon fibre packaging of the sensor is substantially impervious to light, it is found that light grey, light blue and white packaging, preferred for aesthetic reasons, allow some leakage, particularly through cracks between the packaging layers.

Trigger cells without scintillator, and covered with an opaque layer, such as the peripheral trigger pixels mentioned above, are not susceptible to light leakage, but still respond rapidly and reliably to x-rays.

The trigger pixels of the invention can also be used to detect the end of an x-ray emission from the x-ray source and hence be used to record a duration of an x-ray exposure, for example, for logging exposure by a patient.

Thus a trigger system has been described for inclusion on a dental x-ray sensor chip to detect the start and end of an x-ray dose which will detect the start of a burst of x-rays of unknown flux within approximately one millisecond without false triggers and in the presence of arbitrarily placed metal dental fillings. X-ray flux is set by beam current and range to suit a type of image required (i.e. teeth or gums) and the exposure time intended (10 to 250 ms).

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

The invention claimed is:

1. An imaging apparatus for x-rays comprising:
   a scintillator, overlying an array of imaging pixels on a substrate;
   a trigger pixel externally peripheral to the array of imaging pixels on the substrate such that the trigger pixel is not substantially overshadowed by the scintillator from incident x-ray radiation; and
   a layer substantially impervious to light but transparent to x-rays, wherein the trigger pixel is unresponsive to light but triggered by direct hits from incident x-ray photons.

2. An imaging apparatus as claimed in claim 1, further comprising a fiber-optic plate underlying the scintillator, such that the trigger pixel is not substantially overshadowed by the fiber-optic plate from incident x-ray radiation.

3. An imaging apparatus as claimed in claim 1, wherein the trigger pixel has a substantially higher signal voltage per unit x-ray dose than any one of the array of imaging pixels, such that a single x-ray photon incident on the trigger pixel gives a signal substantially above a pixel read noise and such that relatively few incident x-ray photons saturate the trigger pixel, so that discrimination of a signal from noise in a 1 ms sample time is high, and the reliability of trigger is high.

4. An imaging apparatus as claimed in claim 3, wherein the trigger pixel has a lower electrical capacitance than any one of the array of imaging pixels.

5. An imaging apparatus as claimed in claim 1, wherein the trigger pixel is sufficiently large that charge generated by an incident x-ray photon is likely to be contained in a single pixel, rather than spread over a number of adjacent pixels.

6. An imaging apparatus as claimed in claim 5, wherein the trigger pixel is substantially 20 µm square.

7. An imaging apparatus as claimed in claim 1, wherein a photodiode of the trigger pixel has a substantially smaller photosensitive area than a photosensitive area of each of the imaging pixels.

8. An imaging apparatus as claimed in claim 1, wherein a read circuit for the peripheral trigger pixel differentiates between a small charge due to dark current and a large charge due to incidence of x-ray photons.

9. An imaging apparatus as claimed in claim 1, wherein a ratio of good peripheral trigger pixels to faulty x-ray peripheral trigger pixels is sufficiently large that in a typical sample time faulty pixels permanently giving a hit or not hit state do not give a false or missed trigger.

10. An imaging apparatus as claimed in claim 1, further comprising a threshold comparator, for counting a number of peripheral trigger pixels having a signal above a predetermined threshold signal for comparison with a count threshold, to signal a beginning or end of an x-ray emission.

11. An imaging apparatus as claimed in claim 1, wherein the trigger pixel is located between contact pad located proximate an edge of the substrate.

12. An imaging apparatus as claimed in claim 1, wherein the layer substantially impervious to light is an aluminum layer.

13. An imaging apparatus as claimed in claim 1, comprising a plurality of trigger pixels sufficiently spaced apart such that in use not all of the plurality of trigger pixels may be simultaneously shadowed by one or more tooth fillings or crowns which is or are substantially opaque to x-rays.

14. An imaging apparatus as claimed in claim 1, further comprising an array trigger pixel covered with the scintillator within the array of imaging pixels.

15. An imaging apparatus as claimed in claim 14, wherein the array trigger pixel has a substantially higher signal voltage per unit x-ray dose than the imaging pixels.

16. An imaging apparatus as claimed in claim 15, wherein the array trigger pixel has a lower electrical capacitance than any one of the array of imaging pixels.

17. An imaging apparatus as claimed in claim 14, wherein the array trigger pixel is located in one of two rows of array trigger pixels at opposed edges of the imaging array.

18. An imaging apparatus as claimed in claim 17, wherein the array trigger pixels occupy at least half a length of the opposed edges of the imaging array.

19. An imaging apparatus as claimed in claim 14, wherein triggers from the peripheral trigger pixels and the array trigger pixels are required before integration of an image is started.

20. An imaging apparatus as claimed in claim 14, further comprising a trigger configuration register to specify which one or both of an array trigger pixel circuit and a peripheral trigger circuit is or are to be used to start and stop image capture respectively.

21. An imaging apparatus as claimed in claim 1, further comprising an untrigger delay time register for storing a delay time for which a signal indicating an end of an x-ray exposure is to be delayed to ensure that no further x-rays are detected during the delay.

22. An imaging apparatus as claimed in claim 1, for use with a low flux of x-rays arranged to integrate an image while the trigger pixel integrates an x-ray direct hit, so that a signal that no x-rays are detected will reset the imaging array but a signal that x-rays are detected will block the reset and allow integration to continue.

* * * * *